A. FISCHER.
Toe-Weight for Horseshoes.

No. 217,686. Patented July 22, 1879.

Attest:
A. Barthel
Charles J. Hunt

Inventor:
A. Fischer
By Atty
Thos. S. Sprague

UNITED STATES PATENT OFFICE.

ALBERT FISCHER, OF DETROIT, MICHIGAN.

IMPROVEMENT IN TOE-WEIGHTS FOR HORSESHOES.

Specification forming part of Letters Patent No. 217,686, dated July 22, 1879; application filed June 19, 1878.

*To all whom it may concern:*

Be it known that I, ALBERT FISCHER, of Detroit, in the county of Wayne and State of Michigan, have invented an Improvement in Toe-Weights for Horseshoes, of which the following is a specification.

The nature of this invention relates to an improvement and means of attaching to horseshoes toe or side weights that can be readily and easily secured in place or removed, as may be desired.

The invention consists in a clip forged or cast upon the shoe, and having a beveled slot, in combination with a weight provided with a recess to fit over a clip, and a bolt for securing the weight to the clip, having a beveled head working in the beveled slot of the clip, as fully hereinafter explained.

Figure 1:
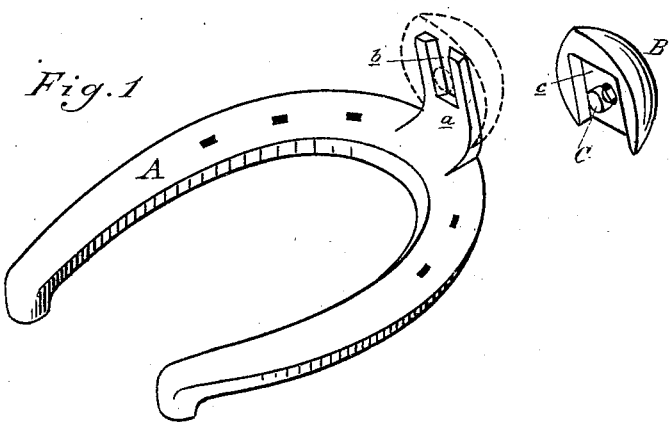
Figure 2:
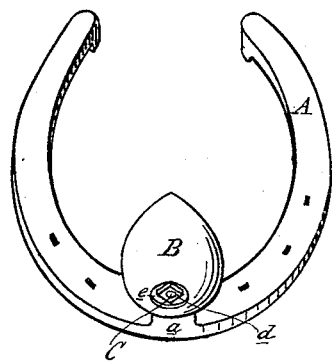
Figure 3:
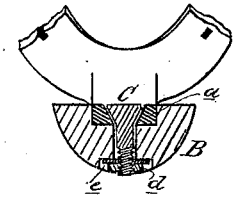

Figure 1 is a perspective view of a horseshoe provided with a slotted clip, and showing a weight attached thereto in dotted lines. Fig. 2 is a front perspective, with a weight in place. Fig. 3 is a cross-section through the clip, weight, bolt, and nut.

In the accompanying drawings, which form a part of this specification, A represents a horseshoe of the ordinary construction, having forged upon it a toe-clip, $a$, which extends up the front of the hoof, and is provided with a slot, $b$, which is beveled from its outer edges rearward and outward, as shown in the cross-section, Fig. 3. B is a weight, made from any suitable material, in the rear face of which is formed a recess, $c$, which receives the clip $a$ of the shoe, and to which it is secured by a wedge-shaped headed bolt, C, the outer end of which is threaded, and receives a nut, $d$, in the recess $e$ in the outer face of the shoe.

The clips can be forged or cast upon the side of the shoe, or at any point where it is deemed necessary to apply the weight. By this construction and means of attaching the weight to the clip, the weight can be readily and easily adjusted, as may be desired, and the turning of the nut upon the bolt draws the head of the latter in contact with the beveled sides of the slot in the clip, and locks the parts firmly, precluding the possibility of the weight flying off while the horse is in action. This construction also admits of the adjustment of the weight to or from the point of the toe, as may be desired.

By having the bolt and nut not projecting beyond the face of the weight, I avoid the danger of the horse injuring itself by interfering with or coming in contact with the edges or corners of nut, as frequently occurs where the nut is upon the outer face of the weight.

If desired, the shank of the bolt, near the head, may be squared to fit into a corresponding square hole in the weight, or otherwise constructed so as to prevent the bolt from turning.

I am aware that toe-weights are attached to horseshoes by means of bolts and flanges or clips, and do not broadly claim such as are in use or known; but

What I claim as my invention, and desire to secure by Letters Patent, is—

A horseshoe having the clip $a$, constructed with a slot, $b$, with beveled sides, in combination with the weight B, having recess $c$, and the bolt C, with beveled head, substantially as described and shown.

ALBERT FISCHER.

Witnesses:
H. S. SPRAGUE,
THEO. S. DAY.